No. 627,293. Patented June 20, 1899.
D. G. BRIGHTON.
METAL SOIL OR OTHER PIPE.
(Application filed Sept. 7, 1898.)

(No Model.)

Witnesses:—
Edward Vieser.
George Barry Jr.

Inventor:—
Douglas George Brighton
by his attorneys
Brown & Seward

THE NORRIS PETERS CO., PHOTO-LITHO., WASHINGTON, D. C.

UNITED STATES PATENT OFFICE.

DOUGLAS GEORGE BRIGHTON, OF LONDON, ENGLAND, ASSIGNOR TO THE SANITARY LEAD-LINING AND PIPE-BENDING COMPANY, LIMITED, OF SAME PLACE.

METAL SOIL OR OTHER PIPE.

SPECIFICATION forming part of Letters Patent No. 627,293, dated June 20, 1899.

Application filed September 7, 1898. Serial No. 690,418. (No model.)

*To all whom it may concern:*

Be it known that I, DOUGLAS GEORGE BRIGHTON, of 11 Hunts-Moor road, Wandsworth, London, in the county of Surrey, England, have invented a new and useful Improvement in Processes of and Apparatus for the Manufacture of Lead-Incased Iron Pipes, of which the following is a specification.

Figure 1:
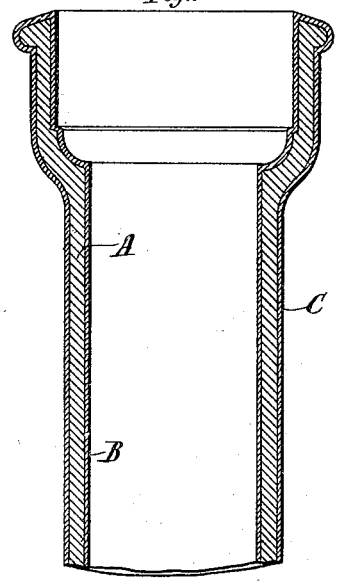
Figure 2:
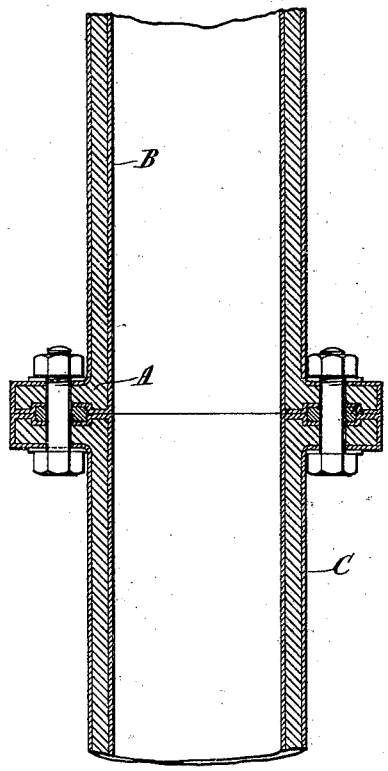
Figure 3:
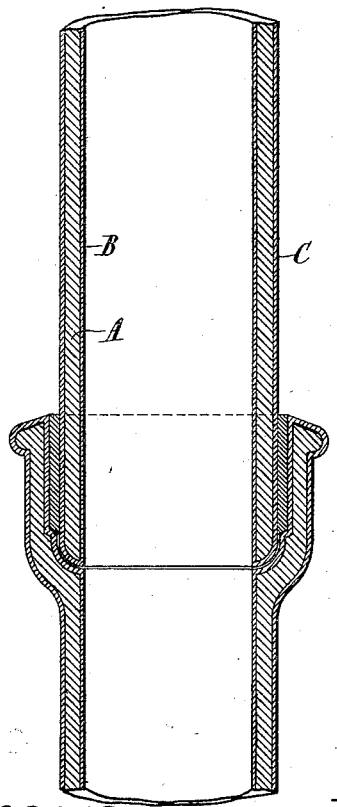
Figure 3:
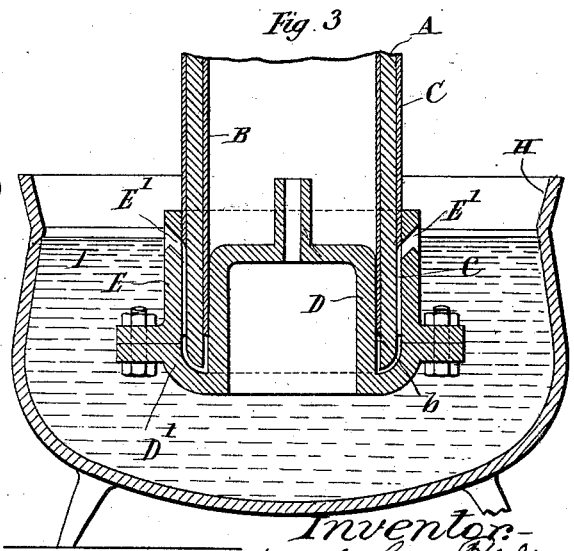

In the accompanying drawings, Figure 1 shows in longitudinal section my invention as applied to spigot and socket end pipes. Fig. 2 is a similar view in respect of flanged end pipes, and Fig. 3 illustrates a mode of forming a spigot end.

The lining of iron pipes with lead to preserve them from internal corrosion is well known and often practiced; but up till recently the lead lining has, it is believed, been applied only in the straight part of the iron pipe. Consequently the spigot and socket or flanged ends of the pipe have been more or less exposed to the corrosive action of water or sewage conducted by the pipe.

The object, then, of my present invention is to effect the casting of the lead coating or lining for the spigot and socket or flanged ends of iron pipes in a simple and efficient manner.

In carrying out this invention I take a comparatively thin iron pipe of any desired form, whether with spigot and socket ends or flanged ends, and I line it with a comparatively thin lead pipe in any well-known manner. I also apply thereto a lead outer skin in any convenient manner, and I connect the inside lining with the outside coating or skin at both ends by a casting operation, so that the iron pipe is entirely incased in lead.

A in the drawings represents the iron pipe. B is the lead lining, and C the lead skin.

The casting of the connection between the lining and skin is effected by the following mode, which is illustrated at Fig. 3, with respect to a spigot end: I make the lining B to come slightly short of the end of the pipe A, as shown at $b$ in Fig. 3, and I cut away or omit the skin C to a greater extent, as shown at $c$. I then take a mold, which I place on the end of the pipe, having gates therein, and arranged to leave a space of the required size, corresponding with the uncoated and unlined terminal portions of the pipe, which space is ultimately to be filled with molten lead. This mold is formed in two parts, viz: first, a main part, which consists of a hollow cylindrical stump D of a diameter to fit the lead lining B and having a curved recessed flange D', the curved recess being shaped to the contour of the spigot end, the larger diameter being equal to that of the skin C, and, second, a flanged ring E, the internal diameter of which is equal to the diameter of the skin C. The ring E is first strung on the pipe. Then the part D is inserted and the two are bolted together.

E' represents gates in the mold, through which molten metal is to be run into the spaces $b\ c$ between the mold and the pipe.

When the mold is fixed in position, I plunge the whole into a caldron H of molten lead I, which finds its way by the gates E' into the spaces $b\ c$ of the mold, wherein it is cast in contact with the edges of the skin C and the lining B, and by the fusion of said edges makes a perfect juncture.

By plunging the end of the pipe and the mold into the molten lead the whole becomes excessively hot and the ends of the lead pipes become fused, so that the lead and that from the caldron run, as it were, together and make a perfect joint.

The flange-pipes will be treated in the same way, the mold being suitably formed for the purpose, so that the entire flange and also the bolt-holes will be covered or lined, as the case may be, with lead.

The socket end of the pipe will be coated in the same way as the spigot end, the mold being suitably modified for the purpose. It will be obvious that the ends of cut pipes will be treated in the same way.

I claim—

1. The method of manufacturing lead-incased iron pipes consisting in first applying to all but the terminal portions of the exterior and interior of the iron pipe a coating and lining of lead and afterward casting on said terminal portions lead which unites by fusion with the exterior coating and interior lining, substantially as herein described.

2. The means of covering the ends of lead-lined and lead-coated iron pipes with lead, consisting of a mold adapted to fit into the lead lining and outside of the lead coating and to inclose the end of the iron pipe and having gates, in combination with a bath for containing molten lead, substantially as herein described.

London, England, August 17, 1898.

DOUGLAS GEORGE BRIGHTON.

Witnesses:
H. K. WHITE,
H. F. C. GOLTZ.